United States Patent

[11] 3,627,102

[72] Inventor Richard C. Talbot
  Stokie, Ill.
[21] Appl. No. 74,418
[22] Filed Sept. 22, 1970
[45] Patented Dec. 14, 1971
[73] Assignee Peters Machinery Company
  Chicago, Ill.

[54] CONVERGER AND FEEDER FOR COOKIES FOR WRAPPING
17 Claims, 7 Drawing Figs.

[52] U.S. Cl. .................................................. 198/26, 198/32
[51] Int. Cl. ..................................................... B65g 47/08, B65g 47/26

[50] Field of Search ........................................... 198/24, 26, 30, 32, 102; 53/159

[56] References Cited
UNITED STATES PATENTS
2,773,583 12/1956 Rand .......................... 198/32 X Primary Examiner—Edward A. Sroka
Attorney—Hill, Sherman, Meroni, Gross & Simpson ABSTRACT: Apparatus for supplying cookies or other articles to be wrapped in side-by-side groups, and discharging the groups of articles onto a wrapping machine conveyor in succession where they are conveyed in separated relation relative to each other and in line to the wrapping machine, in a continuous operation without the use of manual labor.

Patented Dec. 14, 1971

INVENTOR
RICHARD C. TALBOT

BY

ATTORNEYS

INVENTOR
RICHARD C. TALBOT

FIG.4

INVENTOR
RICHARD C. TALBOT

ATTORNEYS

INVENTOR
RICHARD C. TALBOT

ATTORNEYS

FIG. 7

INVENTOR
RICHARD C. TALBOT 3,627,102

CONVERGER AND FEEDER FOR COOKIES FOR WRAPPING

THE FIELD OF THE INVENTION

This invention relates generally to apparatus for segregating and supplying groups of cookies or other articles for wrapping.

THE PRIOR ART

This invention is an improvement on the trap loader of my U.S. Pat. No. 3,290,859 dated Dec. 13, 1966 which counts, separates and loads cookies into trays, and on the converger of my U.S. Pat. No. 3,500,984 dated Mar. 17, 1970 which converges side-by-side groups of cookies and feeds the cookies in separate in-line groups for wrapping.

SUMMARY OF THE INVENTION AND OBJECTS

Apparatus for conveying cookies or other articles in counted groups or slugs and segregating into single in-line groups for wrapping. Two rows of groups of counted cookies are dropped to a hopper in counted groups and released to drop onto a slug conveyor separately carrying the counted groups or slugs, one in advance of the other. The slug conveyor is arranged to retain the cookies in upright positions and convey the groups to be brought into single in-line counted groups of cookies as discharged to the wrapping machine conveyor. The slug conveyor is disposed beneath the hopper and is driven in timed relation with respect to operation of the drop bottoms for the hopper, to receive the groups of cookies in side-by-side spaced relation and supply the cookies to the wrapping machine conveyor. The groups of cookies as supplied to the wrapping machine conveyor, drop to a chute and ejector operable in timed relation relative to travel of the conveyor, to eject the counted groups one by one onto the wrapping machine conveyor which maintains the groups separated and conveys the groups in-line to the wrapping machine.

A principal object of the present invention is to provide an improved form of delivery apparatus to a single strand delivery conveyor continuously supplying counted groups of cookies or other articles to the conveyor to be carried by the conveyor in aligned and separated groups.

Another object of the invention is to improve upon the methods and apparatus heretofore used for delivering cookies and the like to a wrapping machine for wrapping in preselected groups, by providing a simple and improved means for converging and delivering at least two rows of counted groups of cookies to a wrapping machine conveyor in a single line of counted groups of cookies.

A further object of the invention is to provide a novel and improved form of apparatus for converging at least two side-by-side rows of counted groups of cookies in each row, and converging and delivering the cookies to a wrapping machine conveyor, conveying the cookies in a single line in separated groups for wrapping.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
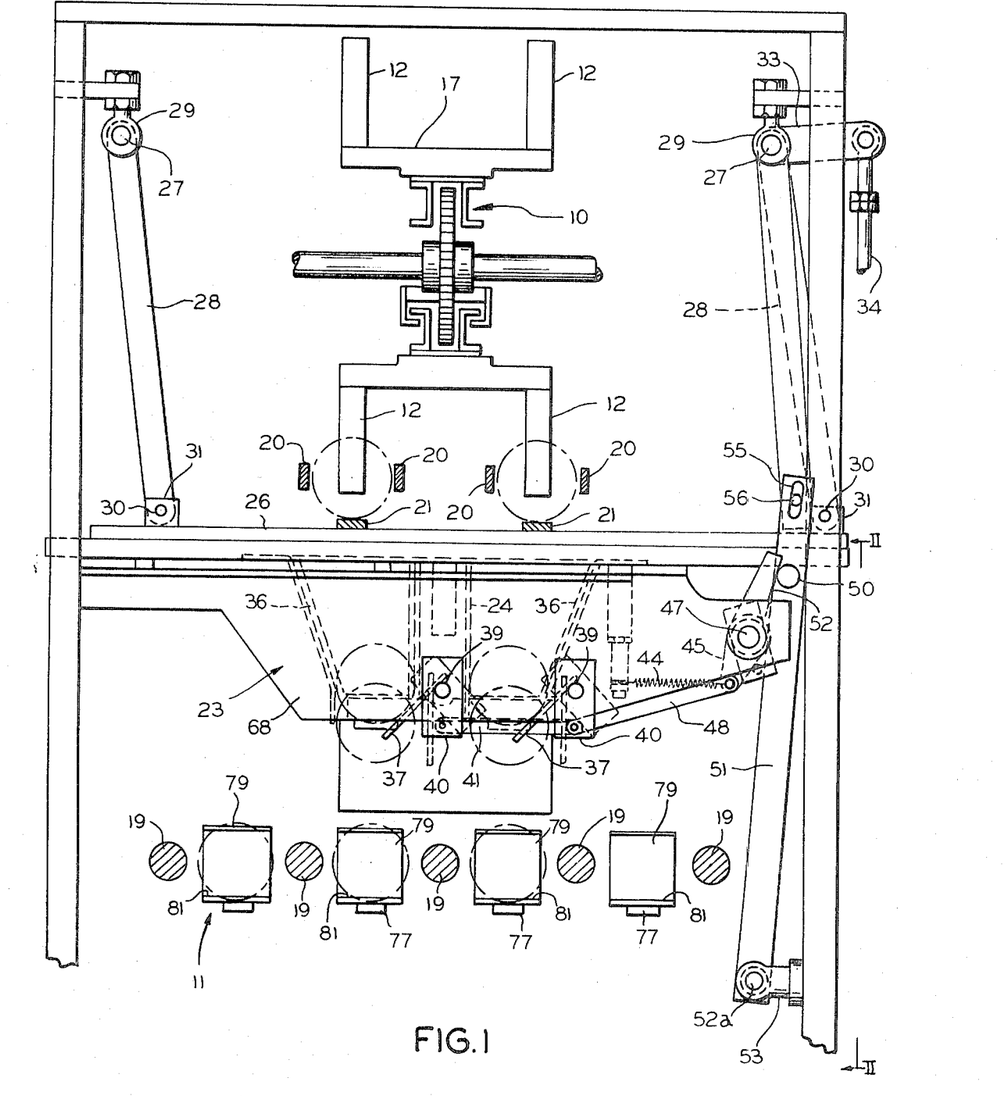
FIG. 1 is a generally diagrammatic transverse sectional view taken through the discharge end portion of the cookie counter and loader and taken longitudinally through the slug conveyor of the loader, illustrating the discharge of groups of cookies between the flights of the slug conveyor.

In the embodiment of the invention illustrated in the drawings, FIG. 1 shown the discharge end portion of a counter and loader for cookies including a transfer conveyor 10 transferring counted groups or slugs of cookies for packaging. Said transfer conveyor is disposed above a slug conveyor 11, extending at right angles with respect to the transfer conveyor, and has spaced flights 12 for conveying counted groups of cookies for discharge to a wrapping machine conveyor 15 (FIG. 3), receiving and separating the groups of cookies and carrying the groups of cookies in aligned separated groups for wrapping by the wrapping machine (not shown) in a conventional manner.

The transfer conveyor 10 is at the discharge end of a counting conveyor (not shown) counting and delivering counted groups of cookies to said transfer conveyor, as shown and described in my U.S. Pat. No. 3,290,859 dated Dec. 13, 1966. The details of the counting conveyor and transfer conveyor, therefore, need not be shown or described herein, since they form no part of the present invention.

The transfer conveyor 10 as shown in FIG. 1 is driven with dwells for the discharge of cookies during each dwell and has attachments 17 secured thereto which depend therefrom when the conveyor is traveling along its conveying run. Each attachment 17 has a pair of laterally spaced conveyor flights 12 extending downwardly between side rails 20, for conveying rows of counted groups of cookies between said side rails and along drop gates 21. The drop gates 21 are movable laterally relative to the side rails 20 to drop two rows of counted cookies in preselected groups into a hopper 23, disposed inwardly of sideplates 68 of the frame of the machine. Said hopper is beneath said transfer conveyor, and is of sufficient width to receive two side-by-side rows of cookies. A divider 24 extends along the center of the hopper 23 between the inner guide rails 20, to retain the cookies dropped by the drop gates 21 to each side of the hopper. As herein shown, the divider 24 is of an inverted U-shaped form mounted within sidewalls 25 of the hopper, and may be adjusted to conform to different sizes of cookies.

The crop gates 21 are part of a laterally movable drop gate carriage 26, suspended from rock shafts 27 on pairs of parallel links 28. The rock shafts 27 are journaled in aligned bearing supports 29. The parallel links 28 have shafts 30 mounted on their lower ends, and mounted at their opposite ends in upright brackets 31 on the carriage 26.

The drop gate carriage 26 is moved back and forth in timed relation with respect to travel of the transfer conveyor 10, to drop two rows of uniform groups of cookies into the hopper 23, by rocking movement of a lever arm 33 secured to an extending outwardly of a rock shaft 27. A link 34 is pivotally connected to the outer end of the lever arm 33 and depends therefrom and is pivotally connected at its lower end to a lever arm (not shown) on a rock shaft (not shown) operated to move the drop gates 21 laterally with respect to the side rails 20, to release groups of cookies to the hopper 23 during each dwell in travel of the conveyor 10. The mechanism for actuating the drop gates in timed relation with respect to intermittent travel of the transfer conveyor 10 is shown and described in my U.S. Pat. No. 3,290,859, so not herein shown or described further.

The hopper 23 has spaced sidewalls 36 extending transversely of the end walls 25 and spaced from opposite sides of the divider 24. The sideplates 36 may be adjustable mounted on the hopper 23 to accommodate adjustment thereof in accordance with the size of the cookies, or other articles dropped by the drop gates 21. The walls 36 converge toward the divider 24 as they approach the bottom of the hopper and guide cookies or other articles into engagement with pivoted gates or drop bottoms 37 extending into the spaces between the sidewalls 36 and end plates 25 of the hopper.

Figure 2:
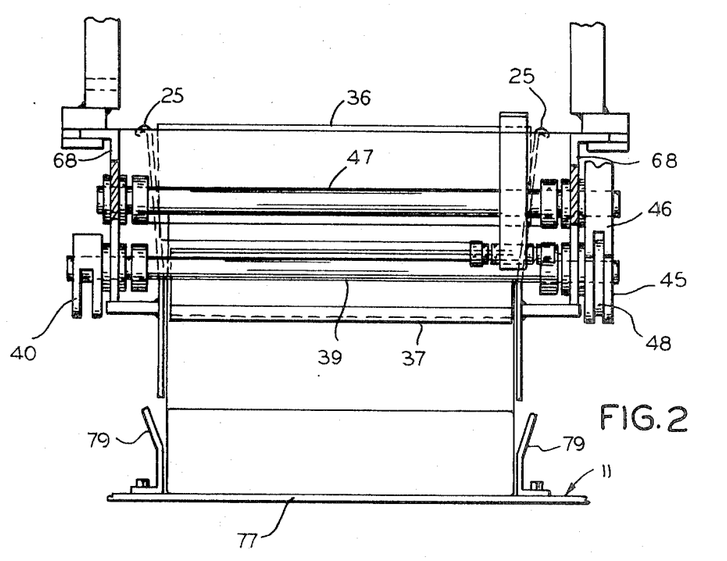
FIG. 2 is a partial fragmentary end view of the apparatus shown in FIG. 1 looking at the apparatus along line II—II of FIG. 1 with certain parts broken away and certain other parts shown in section.

Each drop bottom 37 extends along and is mounted on an individual rock shaft 39 as by welding or in any other suitable manner. Said rock shafts are suitably journaled in sidewalls 68 spaced outwardly of the end walls 25 of the hopper (FIG. 2). The rock shafts 39 each have a lever arm 40 depending therefrom and suitably secured thereto. The lever arms 40 are connected together by a link 41, to effect rocking movement of said drop gates into their cookie holding and release positions. The rock shafts 39 are biased by a tension spring 44 to normally hold the drop bottoms 37 in the positions shown in FIG. 1, to block the discharge of groups of cookies from the hopper 23 as will hereinafter more clearly appear as this specification proceeds. The right-hand shaft 39 has a lever arm 45 on its end opposite the lever arm 40 and depending therefrom (FIG. 2). The lever arm 45 is connected with a lever arm 46 mounted on a rock shaft 47 by a link 48. Said rock shaft 47 is mounted between the sideplates 68 of the frame for the machine. The tension spring 44 is connected to the lever arm 45 to bias the drop bottoms 37 into their cookie retaining positions. The rock shaft 47 is rocked in timed relation with respect to movement of the drop gates 21 to effect opening of the drop bottoms 37 after movement of the drop gates 21, to release two rows of cookies to the hopper 23, and discharge two counted groups of cookies into the slug conveyor 11, between the flights 19, thereof, by operation of a laterally movable bar 50, shown as being a round bar and mounted between a pair of parallel spaced levers 51 and engaging a lever arm 52 secured to an extending upwardly of the rock shaft 47. The levers 51 are pivotally mounted adjacent their lower ends on a shaft 52$^a$ mounted in bearing brackets 53, extending inwardly of a main frame member 54 of the machine. Said levers 51 extend above the rod 50 and have slotted upper end portions 55 through which extend pins 56 mounted on the links 28, suspending the drop gates 21 from the main frame of the machine. The links 28 on the rock shafts 27 as previously mentioned, are rocked by the lever arm 33 secured to the rock shaft 27 and extending outwardly therefrom and having the link 34 depending therefrom. The link 34 is moved up and down to rock the lever arm 33 through a suitable cam means (not shown) driven from the drive mechanism driving the counting conveyor (not shown) and the transfer conveyor 10, as shown and described in my U.S. Pat. No. 3,290,859, so need not herein be shown or described further.

As the lever arm 33 is rocked in a counterclockwise direction from the solid line position shown in FIG. 1, the drop gates 21 will be moved laterally to release two slugs or groups of cookies to drop into the hopper 23 into engagement with the drop bottoms 37. During this direction of movement of the lever arm 23 and links 28 the bar 50 will move away from the lever arm 52 and the spring 44 will cause the lever arm 52 to follow the bar 50 and maintain the drop bottoms 37 closed.

As lever arm 33 reverses its direction of movement, the links 28 will return the drop gates into their cookie supporting positions. The bar 50 engaging the lever arm 52 will then pivot said lever arm in a direction to open the drop bottoms 37 and deposit two slugs or groups of cookies between the flights of the slug conveyor 11, carrying the separated slugs of cookies for discharge for wrapping.

Figure 3:
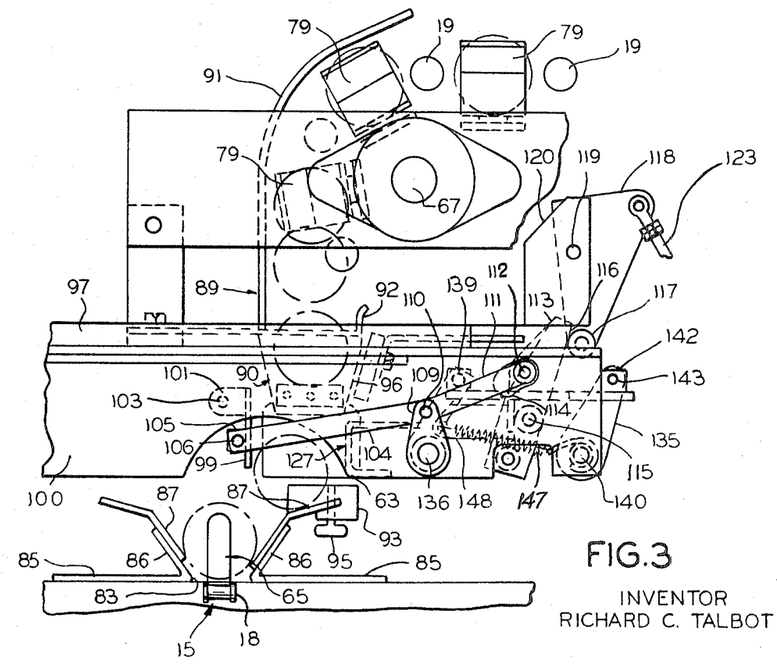
FIG. 3 is a continuation of FIG. 1 and shows the discharge from the slug conveyor to the wrapping machine conveyor.

The slug conveyor 11 turns about a drive sprocket 60 at its outby or discharge end, and travels at right angles relative to the transfer conveyor 10 and perpendicular to the longitudinal centers of the counted groups of articles cropped into the hopper 23, and in timed relation relative to the opening of the drop gates 37, to receive two separated groups of cookies each time the drop gates open. The cookies are supplied to the hopper 23 to drop the cookies, two slugs or groups at a time during travel of the slug conveyor 11 to maintain the spaced between the flights filled with cookies for discharge into a hopper 90 disposed beneath the discharge end of said slug conveyor, from which hopper the cookies are discharged by an ejector mechanism 63 into the spaces between flights 65 of the wrapping machine conveyor 15 (FIG. 3).

The slug conveyor 11 includes a pair of laterally spaced endless chains 66 trained about idler sprockets (not shown) at the inby end of the conveyor and extending beneath the hopper 23 and traveling in a horizontal path perpendicular to the direction of travel of the transfer conveyor 10, to and about the drive sprockets 60 at the discharge end of the conveyor. The drive sprockets 60 are keyed or otherwise secured to a transverse drive shaft 67 suitably journaled in the side frame members 68 for the machine, and driven from a chain and sprocket drive 69 (FIG. 7).

Figure 7:
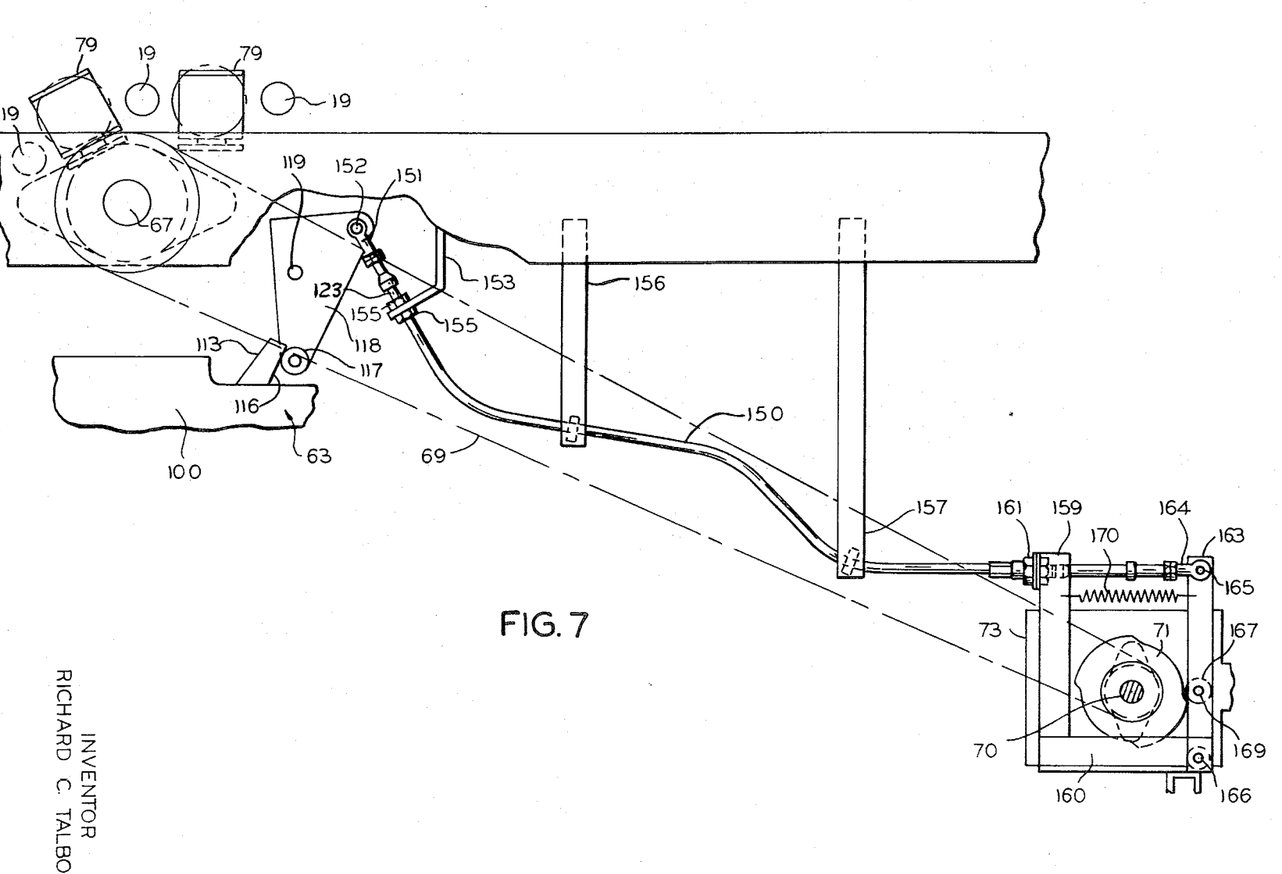
FIG. 7 is a fragmentary view in side elevation of the slug conveyor with certain parts broken away in order to illustrate the drive to the slug conveyor and to the ejector mechanism.

The chain and sprocket drive 69 may be a conventional form and is shown in FIG. 7 as driven from the drive shaft 70, which also drives a cam 71, for actuating the ejector mechanism 63 in a manner which will herein more clearly appear as this specification proceeds. The drive shaft 70 may be driven from a suitable speed reducer 73, driven from the drive mechanism (not shown) for driving the transfer conveyor 10, in a manner similar to that shown and described in my U.S. Pat. No. 3,290,859, so not shown or described further herein.

Figure 5:
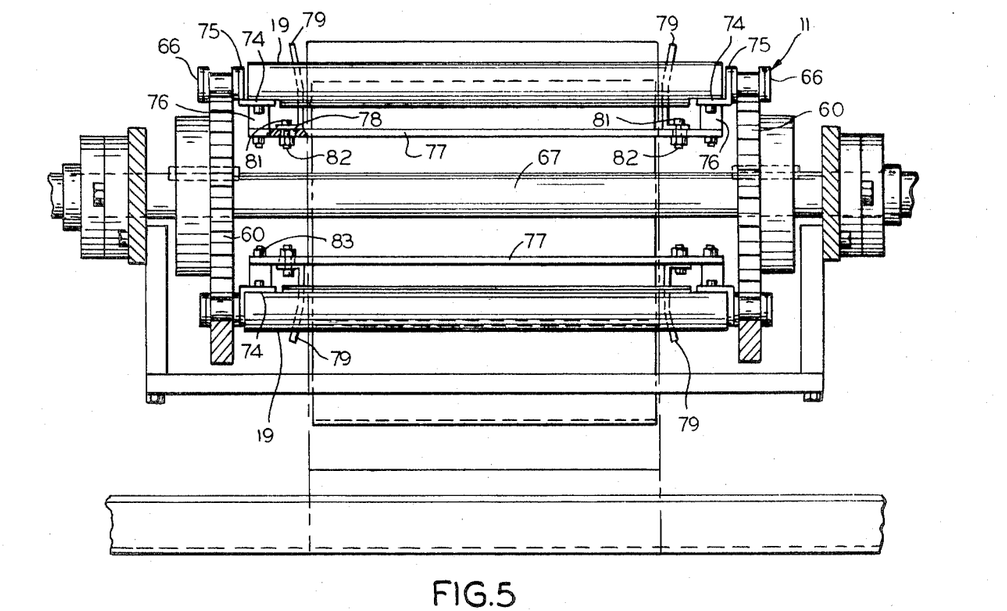
FIG. 5 is an end view of the slug conveyor looking toward the discharge end of the conveyor with certain parts broken away and certain other parts shown in section.

The flights 19,19 of the slug conveyor 15 are shown as being in the form of round bars flattened on their undersides adjacent opposite ends thereof, to be engaged by and secured to inwardly extending legs 74 of attachments 75, secured to the links of the endless chains 66 in a suitable manner and spaced along said chains (FIG. 5). Certain attachments 75 are connected to intermediate links of the chain between the flights 19. The inwardly extending legs 74 of said intermediate attachments have spacers 76 suitably secured to and depending from opposite ends thereof, and forming a mounting means for a transverse plate 77, centered between the flights 19,19. The plate 77 forms a support for a groups or slug of counted cookies, for carrying the cookies between the flights 19,19. The plate 77 has slots 78 at opposite ends thereof, forming adjustable mountings for end retainers 79, spaced apart in accordance with the number of cookies in the slug of cookies discharged between the flights 19,19 to retain the cookies in their upright positions. The end retainers 79 have outwardly flared upper end portions guiding the cookies as discharged onto the support plate 77, and have right-angled bottom legs 81, through which extend bolts 82 extending through the slots 78 and bolting the end retainers to the support plate 77 but accommodating adjustment of said retainers in accordance with the number of cookies in the slug, to be discharged between each pair of flights 19,19 onto the support plates 77.

The slug conveyor 15 may be driven at a constant rate of speed, governed by the discharge of groups of cookies from the hopper 23, under the control of the drop bottoms 37, so that each time two groups of cookies are released they will be discharged onto the plates 77 in the spaces between three flights 19 of the slug conveyor, and maintain the slug conveyor full from the hopper 23 to the discharge end of the conveyor.

The wrapping machine conveyor 15 is shown as being a chain and sprocket type of conveyor, like that shown and described in my prior U.S. Pat. No. 3,500,984, and includes a single strand endless chain 18 trained about suitable drive and idler sprockets (not shown) and carrying the upright flights 65. The flights 65 extend upwardly through a slot 83 extending along a table 84 for the wrapping conveyor. The flights 65 are arranged in pairs of leading and trailing flights and are moved about their axes of connection to the chain 18 and are controlled to incline the leading flights in a leading or forward direction and the trailing flights in a trailing or rearward direction as the flights pass beneath the ejector mechanism 63 to receive a group or slug of cookies in the spaces between the flights 65. The flights 65 may be controlled by cams (not shown), to bring the flights into perpendicular relation with respect to the table 84 as they approach the wrapping machine, to close the spaces between the cookies and hold the cookies in vertical positions, in the manner shown and described in U.S. Pat. No. 3,500,984, so not herein shown for described further.

Troughlike retainer 85,85 extend along opposite sides of the slot 83 and have flared sidewalls 86 diverging from said slot as they extend towards the ejector mechanism. Deflector plates 87 extend along said flared sidewalls for a portion of the length thereof, beneath the ejector mechanism 63, to form a trough extending in the path of travel of the flights 65, to retain the cookies to said flights as discharged therebetween.

Referring now in particular to the discharge from the slug conveyor 11 to the ejector mechanism 63, a chute 89 having a vertical centerline in alignment with the centerline of the flights 19, as they intersect a horizontal center line extending to the center of rotation of the shaft 67, is provided to guide the cookies to a hopper 90 of the ejector mechanism disposed therebeneath. The chute 89 has an upright forward wall 91 extending upwardly along the outer ends of the retainers 79, as they turn about the drive sprockets 60 for the conveyor 11 and generally conforming to the path of travel of the conveyor as it turns about said drive sprockets. The chute 89 also includes a rearwardly spaced wall 92 disposed within the limits of the retainers 79 and cooperating with the forward wall of said chute to guide the cookies for discharge into the hopper 90 of the ejector mechanism 63.

The hopper 90 converges toward its discharge end and guides the cookies to drop onto a deflector plate 87 between end guides 93 mounted on said deflector plate 87 for adjustable movement toward and from each other. The end guides 93 each have a slot 94 formed therein, fitting along said deflector plate and extending at the angle of said deflector plate. A thumbscrew 95 is provided for each end guide to accommodate adjustment of the guides to generally conform to the spacing between the end retainers 79 of the conveyor 11.

The hopper 90 has opposite end guides 96, which may be mounted on sideplates 100 of the frame for the ejector mechanism on machine screws or other suitable mounting means, to accommodate adjustment of the end guides toward and from each other in accordance with the spacing between the retainer members 79.

The hopper 90 thus guides the cookies for discharge onto the deflector plate 87 to be moved along said plate into the trough formed by the flared sidewalls 86 and in the space between the leading and trailing flights on the conveyor 15.

As a slug of cookies drops through the hopper 90 onto the deflector plate 87 between the end guides 93 thereof, the slug of cookies will tend to roll downwardly along said flared plate into engagement with a gate 99. The gate 99 extends between opposite sideplates 100 and has spaced lugs 101 extending from the upper end portion thereof in a direction away from the hopper 90, and pivotally mounted between the sidewalls 100 on a pivot pin 103. The gate 99 is retained in the position shown in FIG. 3, to retain cookies to the flared plate 87 and is moved in a direction away from said flared plate to release the cookies to fall to the wrapping conveyor 15, as by a link 104 actuated by lever mechanism which will now be described.

The link 104 extends along one side of the gate 99 and is pivotally connected to an ear 105 extending from said gate, as by a pivot pin 106, secured to and extending outwardly of the ear 105. The link 104 is pivotally connected at its end opposite the gate 99, to a lever arm 109 by a pivot pin 110. The lever arm 109 is suitably secured to a transverse shaft 136, for rocking said shaft upon rocking movement of said lever arm. The lever arm 109 is rocked by a link 111 pivotally connected at one of its ends to the lever arm 109 on the pivot pin 110. The opposite end of said link is pivotally connected to the outer end portion of a lug 112 extending outwardly of a lever arm 113, through an arcuate slot 114 in the sideplate 100. A pair of spaced lever arms 113 are pivotally mounted between the plates 100 on a pivot shaft 115 disposed beneath the lug 112 and suitably mounted in the sideplates 100.

The lever arms 113 have faces 116 on the opposite sides thereof from the link 111 engaged by coaxial actuating rollers 117 on the lower end of spaced lever arms 118, herein shown as being bellcranks. The bellcranks 118 are pivoted adjacent their upper ends on a pivot pin 119 mounted between brackets members 120 extending upwardly of the bottom portion of the frame for the conveyor 11 and chute 89. The rocking lever 118 is rocked back and forth by a flexible cable 123, actuated by the cam 71 in a manner which will hereinafter more clearly appear as this specification proceeds.

Figure 4:
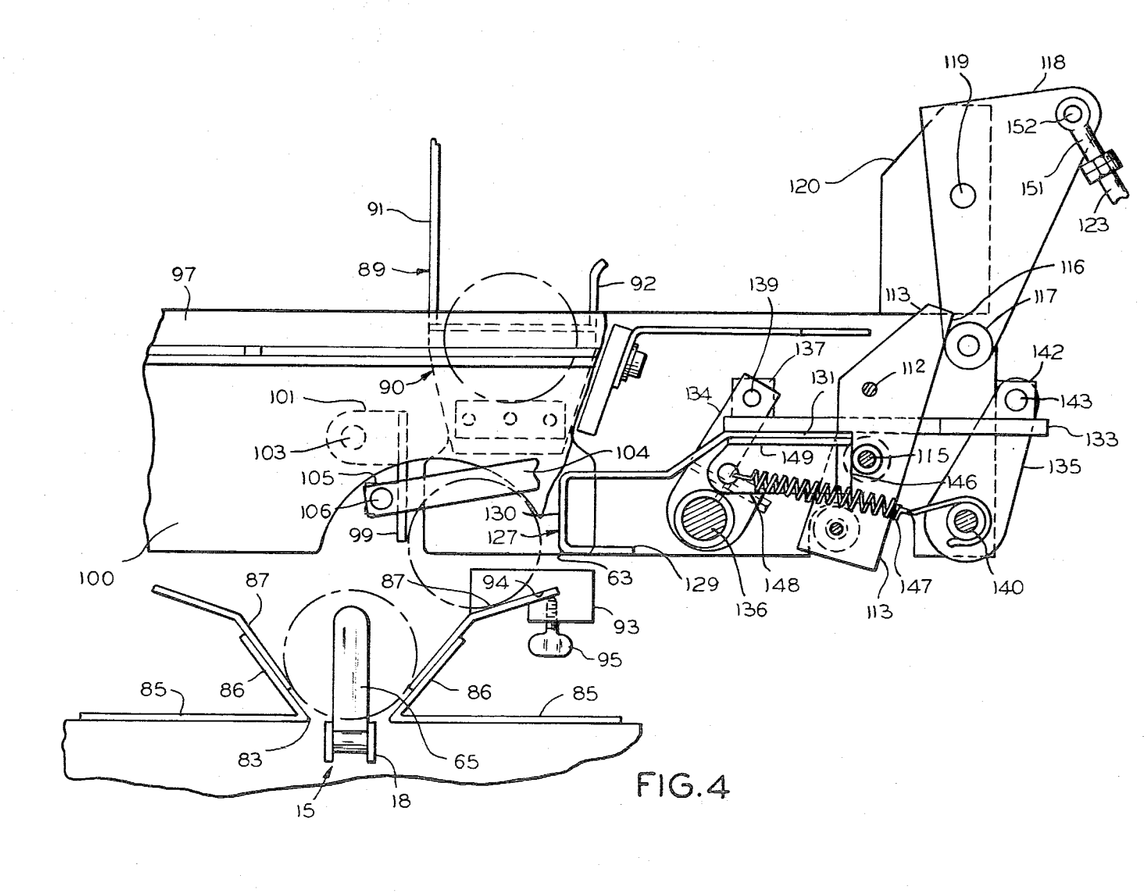
FIG. 4 is an enlarged partial fragmentary detail view with certain parts broken away in order to show certain details of the ejector mechanism now shown in FIG. 3.

The ejector mechanism 63 also includes an ejector plunger 127 mounted for reciprocal movement with the gate 99 in the direction of movement of said gate, to positively eject rows of cookies in the spaces between the leading and trailing flights 65 of the wrapping conveyor 15. The ejector plunger 127 is shown in FIG. 4 as having a bottom surface 129 extending parallel to the direction of travel of the plunger and terminating into a vertical ejector surface 130. The ejector surface 130 terminates into a rearwardly extending horizontal surface, parallel to the bottom surface 129, and inclined upwardly at its rear end portion to a horizontal surface 131, abutting and suitably secured to the bottom of a suspension plate 133, suspended from the upper end portions of parallel links 134 and 135.

Figure 6:
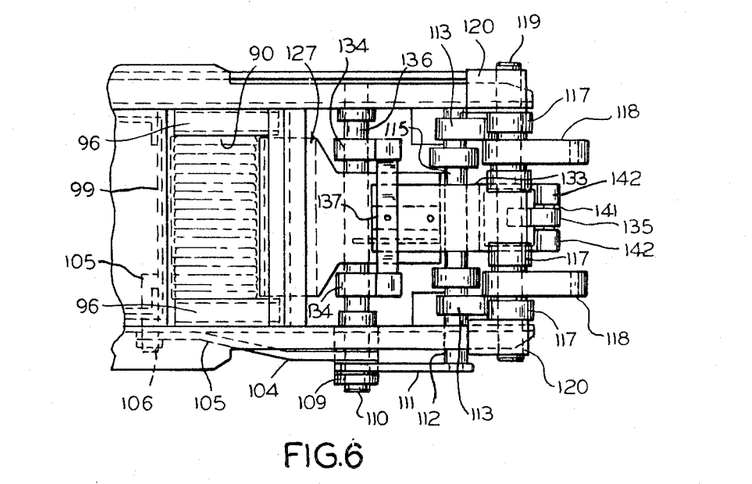
FIG. 6 is a plan view illustrating the hopper and ejector mechanism ejecting cookies in groups to the wrapping machine conveyor.

As shown in FIGS. 4 and 6, two parallel links 134 are clamped or otherwise secured at their lower ends on the transverse shaft 136, rocked by the lever arm 109. The links 134 are pivoted at their upper ends to the opposite outer ends of a bar 137, extending across the suspension plate 133, on pivot pins 139. Said pivot pins are shown as being formed integrally with opposite ends of said bar. The link or lever 135 is pivoted at its lower end on a pivot pin 140 mounted between the side frame members 100, and extends upwardly along and through a slot 141 extending along the longitudinal center of the actuator plate 133 and opening to the rear end of said plate. Said link is pivoted to lugs 142 extending upwardly of said actuator plate along opposite sides of the slot 141, on a pivot pin 143. The actuator plate 133 and ejector plunger 127 are thus suspended from the links 134 and 135 for parallel movement toward and from the center of the hopper 90.

A tension spring 147 is hooked at one end to the shaft 140 and at its opposite end to a tongue 148 depending from a horizontal plate portion 149. Said plate portion is suitably secured to the bottom of the horizontal portion 131 of the ejector plunger 127, which abuts and is secured to the bottom of the actuator plate 133.

Thus as the lever arms 113 are rocked back and forth by operation of the lever arm 118, the link 111 will rock the level arm 109 and shaft 136 and move the ejector plunger 127 and the gate 99 in a direction to positively release and eject a row of counted cookies along the plate 87 into the spaced between leading and trailing flights 65 of the wrapping conveyor 15. The tension spring 147 will return the ejector plunger 127 and the gate 99 into the retracted positions shown in FIG. 3. The spring 147 also serves to bias the levers 113 into engagement with the follower rollers 117 on the bellcrank levers 118.

The cable 123 may be a push-pull control cable of a conventional form guided in a housing 150 and connected with the lever arm or bellcrank 118 at its upper end as by a connector 151 and pivot pin 152 (FIG. 7). The housing 150 extends through a bracket 153 adjacent the bellcrank 118 and is secured in position on said bracket as by nuts 155 threaded on said housing and engaging opposite sides of the bracket. From the bracket 153 the housing extends angularly downwardly and rearwardly towards the cam 71 and is supported in brackets 156 and 157. From the bracket 157 the housing extends horizontally to a bracket leg 159, extending vertically of a frame member 160 forming a part of the main frame of the apparatus. Nuts 161 secure the housing to the leg 159 adjacent the upper end thereof, to extend therefrom toward an actuating lever 163. A connector 164 and pivot pin 165 are provided to connect the end of the push-pull cable to the upper end of said actuating lever. The actuating lever 163 is pivoted at its lower end to the frame member 160 on the opposite side of the cam 71 from the bracket leg 159 on a pivot pin 166. A follower roller 167 is rotatably mounted on said actuator lever intermediate the ends thereof on a shaft or pin 169 and is biased into engagement with the surface of the cam 71 as by a tension spring 170, connected between the bracket leg 159 and the actuating lever 163, above the follower roller 167.

It should here be noted that the cam 71 has two lobes to actuate the ejector plunger 127 and gate 99 twice during each cycle of rotation of the shaft 70. The cam (not shown) operating the drop gates 21 and drop buttons 37 as the gates 21 are moved to their closed positions, may have one lobe and be driven for example by the shaft 70 at the same rate of speed as the cam 71. The ejector plunger 127 will thus operate twice as many times as the drop bottoms 37 to effect aligning of the side-by-side groups of cookies discharged from the slug conveyor 11 into aligned groups of cookies between the flight of the wrapping machine conveyor 15 in a continuous operation.

While the description of the particular apparatus herein shown is directed to the loading of cookies for wrapping, it should be understood that the apparatus is not limited to the loading of cookies, but may be used to load articles of various types and shapes, such as, detergent cakes, poker chips and various other articles.

I claim as my invention:

1. In an apparatus for segregating groups of articles into inlined separated groups for wrapping,
    a first conveyor having a material carrying run including,
    a pair of laterally spaced endless chains,
    parallel flights between said chains,
    means between said flights for supporting separated groups of articles therebetween,
    means driving said endless chains at a preselected uniform speed,
    means discharging groups of articles into the spaces between said flights to provide a continuous supply of articles for successive discharge from the discharge end of said conveyor,
    a second conveyor extending at right angles to said first conveyor for receiving and carrying the separated groups of articles in separated in-line relation for wrapping, and
    ejector and holding means at the discharge end of said first conveyor for successively receiving groups of articles discharged thereby and ejecting the groups of articles onto said second conveyor in in-line relation.

2. The apparatus of claim 1, wherein the ejector and means at the discharge end of the conveyor for successively receiving groups of articles discharged thereby, includes guide means extending partially about the discharge end of said first conveyor and opening in a downward direction, and ejector mechanism retaining articles from discharge onto said second conveyor and positively ejecting the articles in groups onto said second conveyor.

3. The apparatus of claim 2, wherein the ejector mechanism includes a pivoted gate at one side of said guide means,
    an ejector plunger at the opposite side of said guide means and cooperating with said gate to retain articles from discharge onto said conveyor, and
    means rectilinearly moving said plunger and simultaneously pivoting said gate to effect the positive discharge of articles onto said second conveyor in in-line relation relative to each other.

4. The apparatus of claim 3,
    wherein the second conveyor is disposed beneath said guide means and travels in a horizontal path perpendicular to the path of travel of said first conveyor,
    wherein the second conveyor includes a trough having a deflector plate extending beneath said guide means in article receiving relation with respect thereto, and
    wherein said gate and ejector retain a row of articles on said deflector plate and positively eject a row of articles along said plate onto said second conveyor.

5. The apparatus of claim 4, wherein spaced end guides are mounted on said deflector plate for adjustable movement therealong to accommodate the spacing of said end guides in accordance with the number of articles in the group of articles, to maintain the articles in upright positions, as discharged onto said deflector plate.

6. The apparatus of claim 4, wherein power means are provided for rectilinearly moving said ejector plunger and angularly moving said gate which comprise cam and follower means driven in timed relation with respect to travel of said first conveyor.

7. The apparatus of claim 2,
    wherein the second conveyor includes a chain having a conveying run traveling at right angles to the path of travel of the first conveyor and having flights extending upwardly of said conveying run,
    wherein a trough extends along said chain and has a deflector plate extending outwardly therefrom and disposed beneath said guide means,
    wherein the ejector mechanism includes a vertically extending gate disposed to one side of said deflector plate and pivoted for movement about a horizontal axis extending transversely of said guide means,
    wherein the ejector plunger is disposed at the opposite side of said guide means and is supported for reciprocable movement toward and from said gate,
    wherein means are provided for reciprocably moving said plunger in accordance with the discharge of cookies into said hopper, and
    wherein a linkage connection is provided between the means reciprocably moving said ejector plunger and said gate to hold said gate in position to retain cookies on said deflector plate when said plunger is in a retracted position and to move said gate to release a group of articles on said deflector plate as said plunger moves in an extensible direction to eject a group of articles between the flights of said conveyor.

8. The apparatus of claim 7, wherein spring means bias the ejector and plunger into retracted positions to accommodate the depositing of a group of articles onto said deflector plate and hold the articles thereon until movement of said plunger in an ejecting direction.

9. The apparatus of claim 8,
    wherein end guides are mounted on said deflector plate for adjustable movement therealong in accordance with the length of a group of articles deposited thereon, and
    wherein means are provided for holding said end guides in position.

10. In an apparatus for supplying groups of articles for wrapping, conveyor means conveying laterally spaced rows of articles in preselected groupings and driven with a series of dwells in accordance with the number of articles in each grouping,
    a hopper disposed beneath said conveyor means and of a width to receive two side-by-side groups of articles,
    means operable to drop two side-by-side groups of articles into said hopper during each dwell in travel of said conveyor means,
    at least two drop bottoms for said hopper,
    one for each row of articles,
    a first conveyor disposed beneath said drop bottoms and having flights spaced therealong extending parallel to the groups of articles in said hopper,
    means driving said first conveyor at a constant rate of speed, in a path at right angles to the path of travel of said transfer conveyor,
    other means operable in timed relation relative to movement of said drop bottoms to open positions, for moving said drop bottoms from closed to open positions to accommodate the continuous loading of groups of articles between the flights of said first conveyor, and means at the discharge end of said first conveyor loading the groups of articles into segregated in-line relation.

11. The apparatus of claim 10, wherein drive means are provided for driving said means at the discharge end of said first conveyor at twice the speed of operation of said drop bottoms, to deliver the side-by-side rows of cookies dropped by said drop bottoms into in-line relation.

12. The apparatus of claim 10,
wherein the second conveyor has a material carrying run traveling in a generally horizontal path at right angles to the path of travel of the first conveyor, and
wherein positive acting release means are provided at the discharge end of said first conveyor for successively receiving groups of articles and releasing the articles to said second conveyor to be carried thereby in aligned relation relative to each other.

13. The apparatus of claim 10, wherein the second conveyor includes an endless chain having a conveying run traveling in a generally horizontal path at right angles to the path of travel of the first conveyor and having flights projecting upwardly therefrom along the conveying run of the conveyor,
a trough extending along said chain, retaining articles thereto as deposited thereon,
a deflector plate on said trough in cookie-receiving relation to relative to said first conveyor,
a transversely pivoted end gate on one side of said deflector plate for retaining groups of articles thereto,
an ejector plunger at the opposite side of said ejector plate cooperating with said gate to eject groups of articles along said deflector plate into said trough, and
means rectilinearly moving said plunger and pivotally moving said gate into article holding and release positions.

14. The apparatus of claim 13, wherein the means moving said ejector plunger and gate into cookie holding and release positions comprises cam and follower means timed relative to opening of said drop gates to effect ejecting movement of said plunger and gate at twice the speed of operation of said drop gates, and
wherein yieldable means bias said gate and ejector plunger into retracted positions, retaining cookies to said deflector plate.

15. In a holding and ejector means for loading groups of articles into in-line rows,
a hopper,
a conveyor having a material carrying run having spaced flights extending upwardly therefrom beneath said hopper,
a trough extending along said conveyor and a deflector plate extending partially along said trough and disposed beneath the discharge end of said hopper to accommodate the dropping of groups of articles thereon,
holding and ejecting means between said hopper and said deflector plate and cooperating with said deflector plate to retain a group of articles thereto and eject a group of articles therefrom into said trough including,
a frame supporting said hopper,
a gate disposed to one side of said deflector plate and extending in a generally vertical cookie-retaining position,
means pivoting said gate to said frame for movement about an axis extending transversely thereof,
an ejector plunger on the opposite side of said deflector plate from said gate,
means mounting said ejector plunger for reciprocable movement toward and from said deflector plate,
a linkage connection between said ejector plunger and gate to effect movement of said ejector plunger and gate together, and
other means reciprocably moving said ejector plunger and gate in ejecting and article retaining directions operating in times relation relative to travel of said conveyor.

16. The holding and ejector means of claim 15, wherein the means mounting the ejector plunger for movement towards and from the deflector plate includes,
two links of the same length transversely pivoted to said frame for movement about parallel axes,
suspending connections between said links and said ejector plunger suspending said plunger for generally rectilinear movement,
at least one lever transversely pivoted to said frame,
an operative connection between said lever and ejector plunger for reciprocably moving said plunger upon reciprocable movement of said lever, and
a link and leverage connection between said lever and said gate for simultaneously moving said gate with said ejector plunger.

17. The apparatus of claim 16, including spring means connected between said frame and ejector plunger for biasing said ejector plunger and gate in retracted positions retaining articles to said deflector plate.

* * * * *